US006911793B2

(12) United States Patent
Fritsch et al.

(10) Patent No.: US 6,911,793 B2
(45) Date of Patent: Jun. 28, 2005

(54) OPERATING PROCEDURE AND COOLING SYSTEM MECHANISM FOR THE MOTOR OF AN ELECTRIC POWERED TOOL

(75) Inventors: Frank Fritsch, Mering (DE); Hermann Schuster, Geltendorf (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 10/737,274

(22) Filed: Dec. 16, 2003

(65) Prior Publication Data

US 2004/0189224 A1 Sep. 30, 2004

(30) Foreign Application Priority Data

Dec. 18, 2002 (DE) ........................................ 102 59 372

(51) Int. Cl.[7] .................................................. H02K 9/02
(52) U.S. Cl. ....................... 318/268; 318/473; 388/934; 388/937
(58) Field of Search ......................... 318/268, 430–434, 318/471–473, 484; 388/903, 921, 934, 937

(56) References Cited

U.S. PATENT DOCUMENTS 4,306,264 A * 12/1981 Alessio ........................ 361/23
5,759,085 A * 6/1998 Gugenheimer et al. ........ 451/8
6,320,286 B1 * 11/2001 Ramarathnam .............. 310/50

* cited by examiner

*Primary Examiner*—Bentsu Ro
(74) *Attorney, Agent, or Firm*—Sidley Austin Brown & Wood, LLP

(57) ABSTRACT

An operating procedure for the motor (1) of an electric powered tool. The operating idle speed of the motor (1) is set to a value using regulator electronics (4), and the operating speed is the same as a chosen operating speed ($n_1$). The motor (1) runs on a pre-determined and higher idle speed ($n_2$) for cooling purposes after a specific idle time ($\Delta T$). while the motor (1) runs on the pre-determined operating idle speed ($n_1$). The engine speed is immediately set to the operating speed ($n_1$) once again, when the motor requires a moment of strain at a certain period of time (T3) to maintain simple and comfortable operating procedures.

15 Claims, 3 Drawing Sheets

OPERATING PROCEDURE AND COOLING SYSTEM MECHANISM FOR THE MOTOR OF AN ELECTRIC POWERED TOOL

BACKGROUND OF THE INVENTION

The present invention relates to an operating procedure for the motor of an electric powered tool such as a hammer drill, the operating idle time of which is set to a value using control electronics, which is the same as or slightly higher than the chosen operating speed. The invention also relates to an electric powered tool with specific features to realise the operating procedure.

The durability and operational readiness of the motor of an electric powered tool depends on the motor temperature. Too high a temperature can result in the motor not being able to be run for a certain time while cooling down. Thus, the temperature of the motor should not exceed a certain temperature during operation. The higher the moment of strain that has to be applied to the motor, the more the motor temperature continues to increase. The temperature falls when the motor is run on idle time. The cooling system is improved due to the increased air flow at high engine speeds.

The operating speed is the engine speed of the motor under strain: it is determined by the operating process or specific operating conditions. The engine speed drops when the motor has to be run on an extremely high moment of strain due to the natural characteristic line for strain in the motor (see FIG. 3).

The operating idle speed for the comfortable operation of the electric powered tool should not be much higher than operating speed when the motor is no longer strained, i.e. it is running on idle speed. This would be annoying in hammer drills when the tool is switched off and then switched on again. There should be no major variations in the operating idle speed, as they can also have an interfering effect. The operating idle speed of the motor is thus always limited to a favourable level only slightly above the chosen operating speed.

U.S. Pat. No. 4,307,325 proposes that a strain index be determined according to the amount of time in which a motor is run on idle speed and under strain—with which the temperature of the motor can be determined with only slight complexity. The motor is switched off to prevent damage done should the temperature exceed a certain value. The electric powered tool can only be switched on again when the motor is cooled down, i.e. the electric powered tool cannot be used for a certain amount of time.

The complete switch off of the motor results in an interruption in the cool airflow so that cooling only takes places slowly. DE 30 21 689 AI suggests that the motor be switched off, but that the input is limited in an overload, maintaining a sufficiently high engine speed below the operating idle speed to cool the motor. This, however, does not only take place in the coil overheating. Additionally, the cooling effect is not optimal, as the engine speed of the motor is not sufficiently high due to the limited input. Motor failure due to overheating thus cannot be prevented in certain cases.

SUMMARY OF THE INVENTION

The object of the invention is to ensure sufficient cooling of the motor during the operation of the electric powered tool to prevent motor failure due to overheating. The object is achieved by the invention wherein an operating procedure for the motor of an electric powered tool, the operating idle speed of which is set to a value using regulator electronics, which is the same as one of the chosen operating speeds, whereby the motor is run on a higher and pre-determined idle speed for cooling purposes, should there be no moment of strain on the motor. The motor is still cooled effectively and on a constant basis during normal operational procedures and overheating is thus prevented.

An electric powered tool, according to the invention, presents regulator electronics for the engine speed of its motor, the operating idle speed of which is set to a value, which is the same as one of the chosen operating speeds, and a time measuring device, which sends a trigger signal to the regulator electronics after a certain amount of idle time has passed, whereby the motor is run on a higher and pre-determined idle speed for cooling purposes. It is thus possible that the time measuring device sends a trigger signal immediately, i.e. there is no time delay and the motor is switched over to the increased idle speed as soon as the idle speed has been reached.

The operating procedure, according to the invention, suggests that the motor preferably run on a pre-determined, higher idle time after a specific idle time, while the motor is running on the operating operating idle time. The operating procedure, according to the invention, also suggests that idle time operations be determined preferably by measuring the motor flow or the turning moment of the motor.

It is also advantageous that the idle time be determined in correspondence with the previous strain of the motor.

The idle time is thus shortened and the operating speed switched over, should the motor have previously been run on overload, as soon as a moment of strain above the idle running moment is applied to the motor.

The increased idle speed is then set, as described above, in case the motor was switched off or on again. Increased idle time can be turned on after switching on the motor after a period of idle running, which depends on the previous strain to the motor, should there be no moment of strain to the motor. It is also possible to set the increased idle speed immediately after switching on the motor, should there be no moment of strain to the motor.

A strain measuring device is provided for by the electric powered tool, according to the invention, which measures the motor flow and thus determines the idle operations of the motor, and an idle running signal, which shows the idle running operations of the motor and sends data to the time measuring device and the regulator electronics. The strain measuring device measures the operating strain on the motor and sends a strain signal to the time measuring device to determine idle time corresponding with this strain. The time measuring device determines a shorter period of idle time when a strong strain on the motor was previously measured by the strain measuring device.

The regulator electronics also immediately sets the engine speed of the motor to the operating speed when the idle running signal shows that the motor is not being run in idle time. Comfortable operational procedures are thus guaranteed. The regulator electronics set the engine speed of the motor, as described above, when the motor was switched on or off again.

BRIEF DESCRIPTION OF THE DRAWINGS

The invention as well as further features and advantages of the invention are described in an exemplary manner with reference to the drawings, wherein.

DETAILED DESCRIPTION OF THE INVENTION

The invention suggests that good cooling of the motor and the electronics is attained by setting the engine speed of the motor in idle time to an increased idle speed. The value Δn, by which the engine speed is increased, can be determined or can depend on the previously determined strain. The engine speed of the motor should not be attained, immediately, but after a certain amount of time by increasing the normal operating idle speed to an increased idle speed. The increased idle speed is thus so high that the effective cooling of the motor is ensured, especially after this has been run on overload.

The increased idle speed should at the same time not exceed a certain level as there could be damage to the electric powered tool. The increased idle speed can, however, be interfering when operating the electric powered tool and for other specific applications. The engine speed is thus lowered from the increased idle speed to the operating idle speed without any time delay as soon as the motor requires a moment of strain above the idle running moment. The alteration to engine speed is thus carried out outside of the operational procedure and therefore ensures that stable operational procedures are possible at all time.

Figure 1:
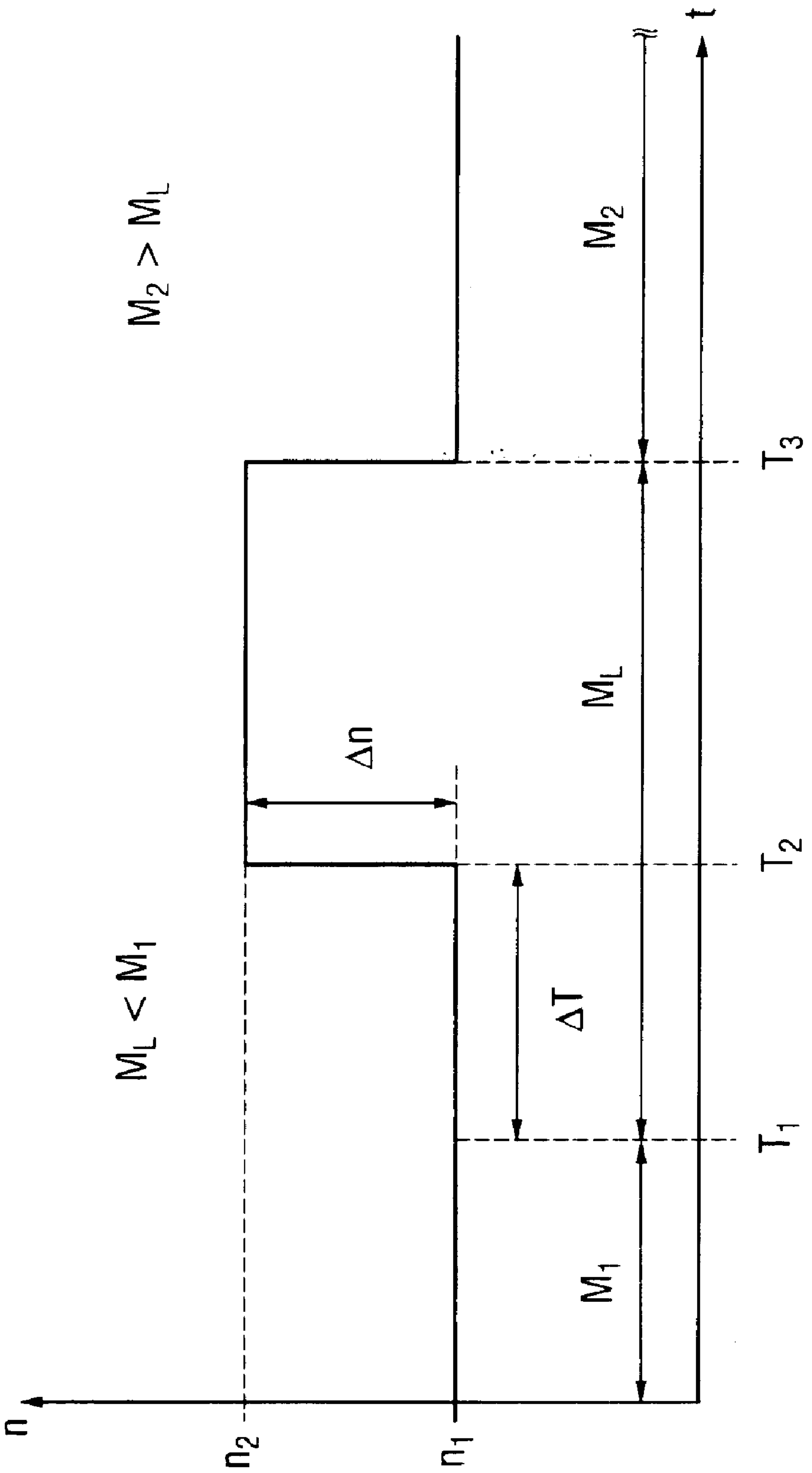
FIG. 1 shows a diagram of the engine speed cycle when the motor is in idle time, whereby the engine speed is increased for cooling purposes, according to the invention.

FIG. 1 shows the cycle of the engine speed, according to the invention. A specific operating moment of strain is first required by the motor up to a certain period of time $T_1$ during normal operating procedures. The motor is no longer strained as of the time period $T_1$, which means that the motor only has to create the moment of idle running ML ($ML<M_1$). The moment of idle running ML is determined by the shortfall of pre-determined current, which the motor accepts. The motor runs on the operating idle speed $n_1$, which is the same as or slightly higher than the operating speed, for a certain period of time ΔT. The idle time ΔT is thus dependent on the cycle of the moment of strain prior to the period of time $T_1$. A preferred operational method, according to the invention, suggests that the value of the idle time ΔT depends on the maximum moment of strain, which occurs between the last cooling and the period of time T.

After the idle time ΔT has been completed, the engine speed of the motor at the period of time $T_2$ of the operating idle time $n_1$ is increased to a higher idle speed $n_2$ by value Δn. Value Δn, by which the engine speed is increased, can be pre-defined or can depend upon the maximum moment of strain that occurs between the last cooling and the period of time T1. The motor runs on the increased idle speed until the moment of strain $M_2$is required above the moment of idle running ML ($M_2$>Mj). The presence of the moment of strain $M_2$ is also determined according to the engine speed by via measurements of the motor flow felt by the motor. In FIG. 1, the period of time $T_3$ requires that the motor provide a moment of strain $M_2$, which is larger than the moment of idle running ML. The engine speed of the motor is thus immediately lowered to the chosen operating speed $n_1$ at this period of time.

Immediate lowering of the engine speed ensures that the operational procedure is simple and comfortable. The increased engine speed is also lowered, should the electric powered tool be switched off or on again and the motor requires a turning moment above the idle running moment ML. The motor could have also been switched off at the period of time $T_3$, according to FIG. 1.

When the motor is switched off and then switched on, the idle time ΔT is complete and the increased engine speed n2 is then switched on after the tool has been put into operation. It is also possible to set the increased idle speed immediately after switching on the tool. The data required to determine the idle time ΔT, i.e. the maximum moment of strain, can be saved on switching off the motor.

In FIG. 1, the motor could thus have been switched on again at the period of time $T_1$.

Figure 2:
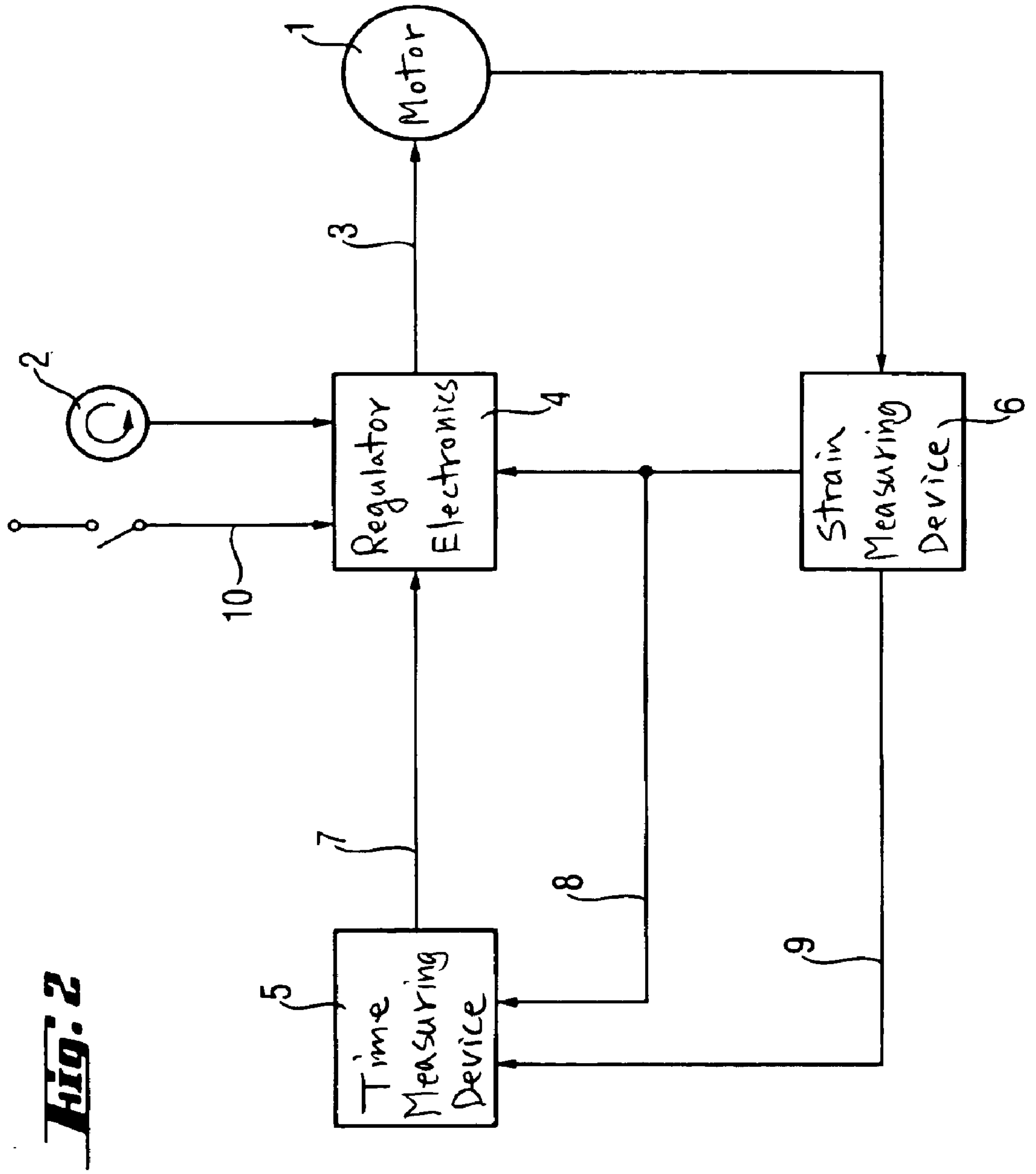
FIG. 2 shows a circuit diagram of part of the electric powered tool, according to the invention.

This block circuit diagram as shown in FIG. 2, according to the operational procedure in the invention, presents the motor 1, the operating speed of which is set to a value using regulator electronics (4), by setting a regulatory signal 3. The regulator electronics 4 set the engine speed to pre-determined values, which are shown via a selector switch 2. The strain measuring device 6 measures the strain of the motor 1 and sends an idle running signal 8 and a strain signal 9. The idle running signal 8 accepts the value "1", when the motor 1 does not have to show a moment of strain, i.e. the motor is running on idle speed and the value "0", should the motor 1 have been speed.

The strain signal 9 takes on continual values, which are dependent on the strain on the motor. A time measuring device determines the idle time ΔT due to the strain signal 9. The idle time ΔT can thus be determine and depend on the maximum moment of strain, which occurs between the last cooling and the period of time $T_1$, or which can depend on the middling strain value. This middling strain value is the middling moment of strain, which occurs between the last and current cooling phase. The cooling phase is the time period, in which the motor is run on the increased idle speed. The strain value is switched back after the increased idle speed has been reached.

The time measuring device starts a timer with the idle time ΔT as the starting point, when the idle running signal 8 is altered from "0" to "1". This takes place at the period of time $T_1$ in FIG. 1. The time measuring device sends a trigger signal 7 to the regulator electronics 4 after the idle time ΔT has been completed. On receiving the trigger signal 7, the regulator electronics 4 increases the operating idle speed n1 at the period of time T1 by Δn to the increased idle speed ($n_2$). It is possible to do without a time delay so that the increased idle speed ($n_2$) can be attained immediately after the idle running has been determined according to the idle running signal 8. Should the value of the idle running signal 8 have changed from "1" to "0", or the electric powered tool be switched off by a switch signal 10 and the value of the idle running signal 8 equal "0", then the engine speed can be lowered immediately to the operating idle speed $n_1$ by the regulator electronics 4 at the period of time (n2).

Figure 3:
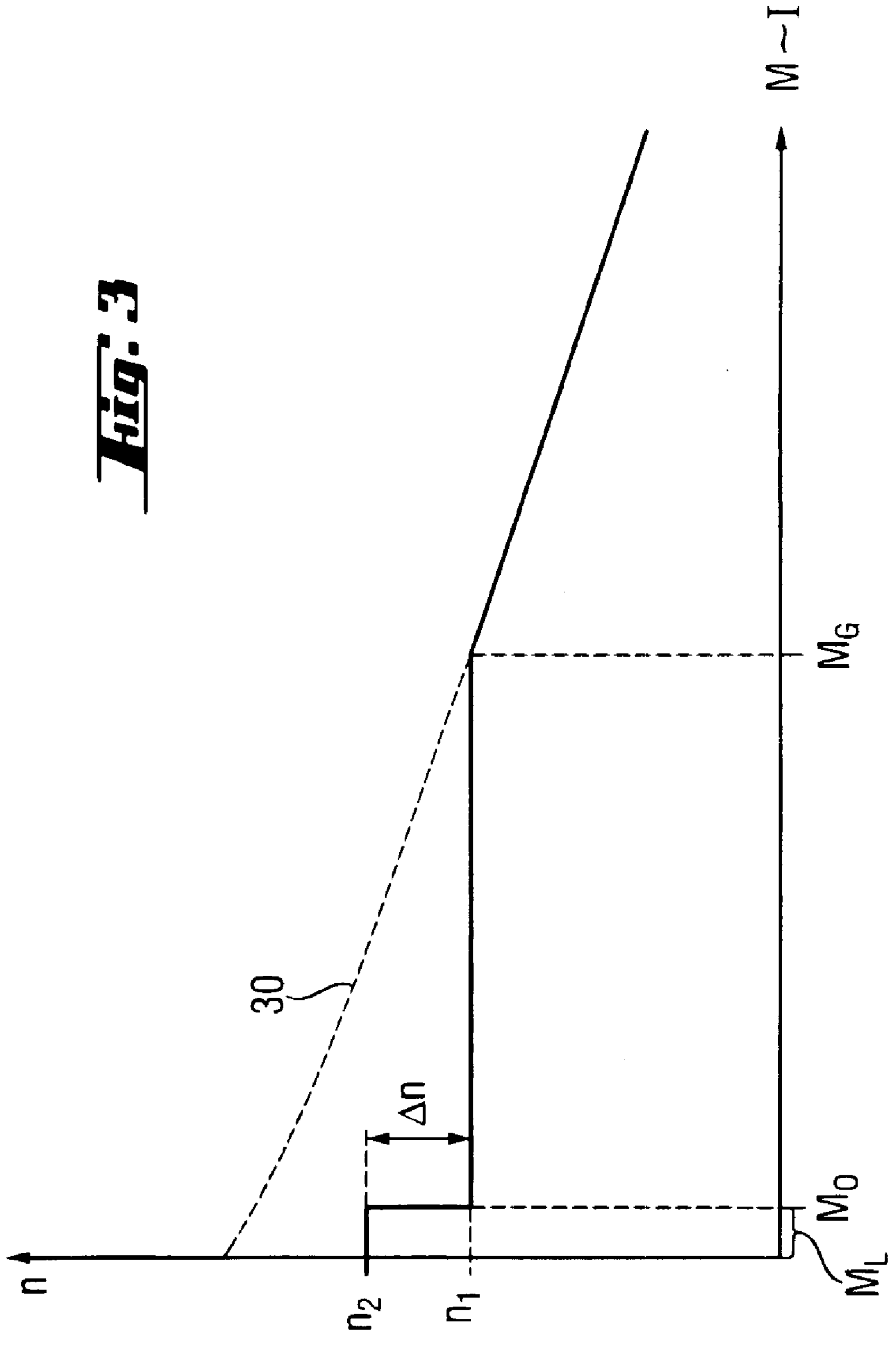
FIG. 3 shows the engine speed—turning moment—characteristic curve of the motor run according to the invention.

FIG. 3 shows the engine speed turning moment characteristic curve when the motor runs on an increased idle speed n2. As can be seen, the motor runs on the increased idle speed n2 until the turning moment M is larger or the same size as an idle turning moment threshold $M_0$. The engine speed of the motor is set to the operating speed in the case of turning moment values, which are larger than or the same size as the idle turning moment threshold $M_0$. The motor runs on its natural characteristic line when the turning moment M surpasses a turning moment limiting value MG.

What is claimed is:

1. An operating procedure for a motor (1) of an electric powered tool, an operating idle speed of the motor (1) is set to a value by regulator electronics (4), the operating idle speed is the same as a chosen operating speed ($n_1$), wherein the motor is run on a pre-determined, higher idle speed ($n_2$) for cooling purposes should there be no moment of strain ($M_2$) for the motor (1).

2. The operating procedure of claim 1, wherein the motor is switched over to an increased idle speed ($n_2$) after a specified idle time (ST) while the motor (1) is running on the operating idle speed.

3. The operating procedure of claim 2, wherein the idle time (ST) is determined in correspondence with a previous strain on the motor (1).

4. The operating procedure of claim 2, wherein the idle time (ST) is shortened should the motor (1) have previously been run in overload.

5. The operating procedure of claim 1, wherein the idle operation is determined by measurement of the motor current flow (I) to the motor (1).

6. The operating procedure of claim 1, wherein the idle operation is determined by measurement of the turning moment (M) of the motor (1).

7. The operating procedure of claim 1, wherein an operating speed ($n_1$) is switched over as soon as a moment of strain above an idle running moment is applied to the motor (1).

8. The operating procedure of claim 1, wherein the increased idle speed ($n_2$) is stopped when the motor (1) has been one of switched off and on again and there is no moment of strain to the motor.

9. An electric powered tool with regulator electronics (4) for the engine speed of the motor (1), an operating idle speed of the motor (1) is set to a value that is the same as a chosen operating speed ($n_1$), wherein the regulator electronics (4) increases the engine speed of the motor to a suitable, pre-determined and increased idle speed ($n_2$), for cooling purposes should there be no moment of strain ($M_2$) on the motor (1).

10. The electric powered tool of claim 9, wherein a time measuring device (5), sends a trigger signal (7) to the regulator electronics (4) after a determined period of idle time has been completed to increase the engine speed of the motor (1) to an increased idle speed ($n_2$).

11. The electric powered tool of claim 9, wherein a strain measuring device (6) measures the motor current flow to determine the idle operation of the motor (1) and sends an idle running signal (8) to the time measuring device (5) and the regulator electronics (4).

12. The electric powered tool of claim 11, wherein the strain measuring device (6) measures the operating strain on the motor (1) and sends a strain signal (9) to the time measuring device (5) to determine the idle time $\Delta T$ in correspondence with this strain.

13. The electric powered tool of claim 12, wherein the time measuring device (5) presents shorter idle time ($\Delta T$) when a strong strain on the motor had been previously measured by the strain measuring device (6).

14. The electric powered tool of claim 13, wherein the regulator electronics (4) immediately sets the engine speed of the motor (1) to the operating speed ($n_1$) when the idle running signal (8) shows that the motor is not run on idle speed.

15. The electric powered tool of claim 14, wherein the regulator electronics (4) sets the engine speed of the motor (1) to the increased idle speed (n2) should the motor have been one of switched off and on again and there was no moment of strain (M2) on the motor.

* * * * *